United States Patent [19]
Guiroy et al.

[11] Patent Number: 5,394,448
[45] Date of Patent: Feb. 28, 1995

[54] METHOD AND DEVICE FOR PROCESSING ELEMENTS ACTIVATED BY IRRADIATION WITH A VIEW TO THEIR REMOVAL

[75] Inventors: Jean J. Guiroy, La Varenne Saint-Hilaire; Remi Thouvenot, Sens, both of France

[73] Assignee: Framatome, Courbevoie, France

[21] Appl. No.: 158,858

[22] Filed: Nov. 29, 1993

[30] Foreign Application Priority Data

Nov. 27, 1992 [FR] France .................. 92 14341

[51] Int. Cl.⁶ .................. G21C 19/34; G21F 9/28
[52] U.S. Cl. .................. 376/260; 376/272; 209/215; 241/24
[58] Field of Search .............. 376/157, 159, 162, 163, 376/245, 255, 254, 260, 463, 272; 209/212, 213, 214, 215, 567, 576, 636; 241/24; 252/627; 423/4

[56] References Cited

U.S. PATENT DOCUMENTS 4,646,978  3/1987  Johnson et al. .................. 241/24
5,168,727  12/1992 Snellink et al. .................. 209/215

FOREIGN PATENT DOCUMENTS 2390808  12/1978  France .
3008991  10/1981  Germany .
4023117   1/1992  Germany .

OTHER PUBLICATIONS

Abstracts of Japan JP 435194, Dec. 1992.

*Primary Examiner*—Daniel D. Wasil
*Attorney, Agent, or Firm*—Pollock, Vande Sande & Priddy

[57] ABSTRACT

The activated elements (4) comprise two constituents having different magnetic characteristics. The first constituent has high activity and the second constituent substantially lower activity. The activated elements (4) are ground to obtain unit fragments, each consisting mainly of the first or of the second constituent. The fragments consisting of the first constituent are separated and sent towards a first discharge and storage station (18, 19, 20), and the fragments consisting mainly of the second constituent are separated and sent towards a conveyor (21). Detection of fragments of the first constituent is carried out on the conveyor, and the fragments deposited on the conveyor (21) are removed to the second discharge and packaging station (24, 25, 26) in the event that fragments of the first constituent are not detected on the conveyor (21).

9 Claims, 2 Drawing Sheets

METHOD AND DEVICE FOR PROCESSING ELEMENTS ACTIVATED BY IRRADIATION WITH A VIEW TO THEIR REMOVAL

FIELD OF THE INVENTION

The invention relates to a method and device for processing elements activated by irradiation, and in particular fuel element jackets of a nuclear reactor of the graphite/gas type with a view to their removal.

BACKGROUND OF THE INVENTION

Nuclear reactors of the graphite/gas type, which are moderated by graphite and cooled by carbon dioxide gas, comprise fuel elements arranged in graphite jackets of tubular shape, comprising, at one of their ends, stainless steel wires which are implanted in the thickness of the graphite jacket and are mutually perpendicular.

The stainless steel wires, "saddle wires", are intended to hold a graphite part termed the "saddle" in the central part of the jacket.

After a certain length of use inside the core of the nuclear reactor, the fuel element jackets must be removed and replaced.

Because of their time spent in the core of the nuclear reactor, the jackets are activated, so that it is necessary to take certain precautions to dispose of them.

Although the graphite of the jackets is moderately activated, the same is not true of the stainless steel constituting the wires, which has very high activity because of the nature of its constituents.

It is therefore desirable, in order to dispose of the jackets for fuel elements under satisfactory conditions, to separate the graphite from the stainless steel wires, so as to store and dispose of the two constituents of the jackets for fuel elements separately.

One of the factors making it possible to facilitate separation of the graphite and of the stainless steel wires is that the stainless steel of the wires is a magnetic steel and that graphite is non-magnetic.

To date no method and device are known which make it possible to process such jackets for fuel elements, with a view to their disposal, automatically and efficiently.

More generally, no method and device are known which make it possible to process and dispose of activated elements comprising two constituents having substantially different magnetic characteristics and activation levels which are also different.

SUMMARY OF THE INVENTION

It is therefore an object of the invention to provide a method for processing elements activated by irradiation with a view to their removal, the activated elements comprising two constituents having different magnetic a first, one of the constituents, having high activity and the or second constituent having a substantially lower activity, this method making it possible to separate and store the two constituents of the activated elements separately, in an efficient and completely automatic manner.

For this purpose:
the activated elements are ground to obtain unit fragments, each consisting mainly of the first or of the second constituent,
the fragments consisting mainly of the first constituent are separated and sent by magnetic means to a first discharge or packaging station, and the fragments consisting mainly of the second constituent are separated and sent by magnetic means towards a continuous handling means,
detection by radioactivity measurement of the fragments consisting mainly of the first constituent is carried out on the continuous handling means,
the fragments deposited on the continuous handling means are removed to a second discharge and storage station if no fragment of the first constituent is detected on the continuous handling means, and towards the first discharge and packaging station if at least one fragment of the first constituent is detected on the continuous handling means.

The invention also relates to a device for processing elements activated by irradiation, with a view to their disposal, comprising:
a grinding mill,
means for removing the product in divided form at the output of the grinding mill,
a magnetic separator having an input part communicating with the removal means of the grinding mill in order to feed it and two output paths for the product in divided form,
a first storage means into which a first output path of the separator emerges,
a continuous handling means with two directions of motion, comprising a first end arranged below the second output path of the separator and above the first packaging means,
a radioactivity detector arranged in proximity to the continuous handling means, and
a second storage and removal means arranged below a second end of the continuous handling means to receive the divided products discharged by the continuous handling means in a first direction of motion.

BRIEF DESCRIPTION OF THE DRAWINGS

In order to explain the invention clearly, a description will now be given, by way of example, with reference to the appended drawings, of one embodiment of the method according to the invention and the corresponding device.

DETAILED DESCRIPTION

Figure 1:
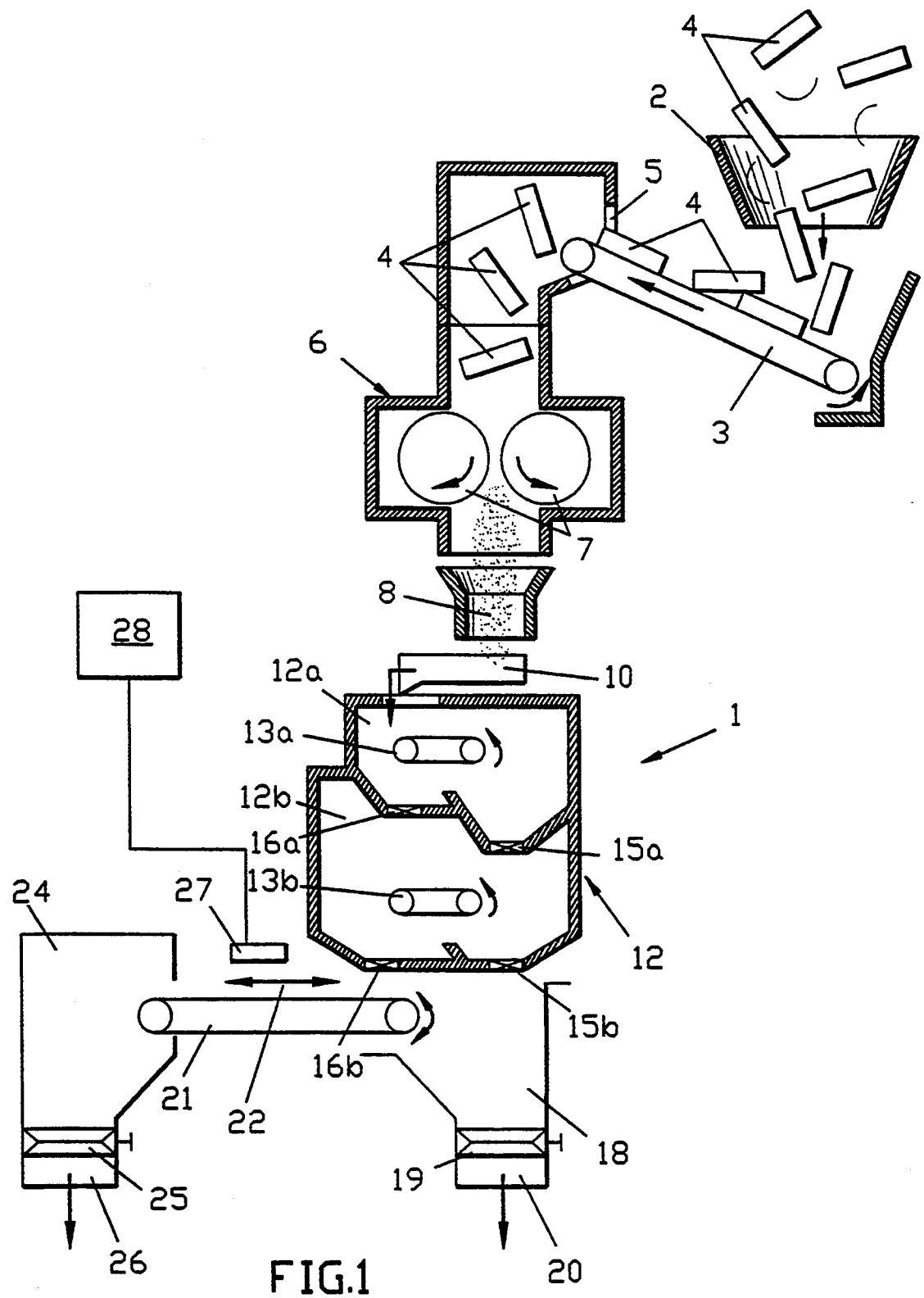
FIG. 1 is a general view in elevation and in section of a device making it possible to carry out the process of grinding the jackets for fuel elements of a nuclear reactor of the graphite/gas type, and separating their two constituents.

FIG. 1 shows the entire installation 1 making it possible to carry out the separate grinding and disposal of the constituents of fuel element jackets of a graphite/gas nuclear reactor.

The installation 1 comprises a feed hopper 2 whose output end is placed above an inclined conveyor 3.

Fuel element jackets 4 made of graphite containing stainless steel wires are discharged into the hopper 2 which feeds them to the input end of the conveyor 3, the output end of which communicates with a chute for feeding an impeller-disk mill 6.

The fuel elements 4 enter the chute 5 which ensures regular feeding of the impeller-disk mill 6 which includes two rollers 7 turning in opposite directions and fitted with grinding cutters.

The grinding mill 6 separates the jackets 4 into fragments which consist either of pieces of graphite with a size of a few tens of millimeters, or shredded fragments of the stainless steel wires.

At the output of the grinding mill 6, a reception chute 8 receives a heterogeneous mixture of fragments consisting either of pieces of ground graphite or of segments of stainless steel wires. The chute 8 removes the mixture of heterogeneous fragments onto a conveyer 10, of the same type as 3, whose output is situated above the input opening of a two-stage magnetic separator 12.

The separator 12 comprises an upper stage 12a and a lower stage 12b, which are equipped with magnetic separation means consisting of assemblies with belts and magnetic rollers, 13a and 13b respectively, of high intensity, of the type comprising rare-earth permanent magnets and which will be referred to below as magnetic rollers 13a and 13b.

Each of the separator stages 12a and 12b comprises two outputs, respectively 15a and 16a and 15b and 16b.

The outputs 15a and 15b, termed the first outputs, are intended mainly to receive the first constituent which is the magnetic constituent, i.e., in the case of fuel element jackets, the stainless steel wire.

The second outputs 16a and 16b are intended mainly to receive the second non-magnetic constituent, i.e., in the case of jackets for fuel elements.

Each of the outputs 15a, 16a, 15b, 16b can be equipped with remotely controlled closure means.

When the heterogeneous mixture discharged by the conveyer 10 into the input opening of the separator 12 arrives in contact with the magnetic roller 13a, the first magnetic constituent, i.e., the stainless steel wires are retained and carried by the roller 13a which discharges them into the hopper of the output 15a of the separation stage 12a. The fragments consisting mainly of graphite are discharged, without being diverted by the roller 13a, into the second output 16a.

The stainless steel wires discharged into the hopper of the output 15a pass into the stage 12b of the separator to be discharged directly into the first output 15b of the stage 12b.

The mixture consisting mainly of graphite which is discharged onto the second magnetic roller 13b undergoes a separation, the stainless steel wires which may remain mixed with the pieces of graphite being retained and transported by the magnetic roller 13b to be discharged into the first output 15b of the stage 12b.

The fragments reaching the first output 15b of the stage 12b, which mainly consist of stainless steel, are discharged into a hopper 18 comprising a closure hatch 19.

Below the hatch 19 is arranged a chute or a storage container 20, as will be explained below with reference to FIGS. 2A, 2B and 2C.

It is unimportant that a few fragments of graphite are still present mixed with the segments of stainless steel wires reaching the first output 15b of the separator, since these graphite fragments have much lower activity than that of the stainless steel. The conditions of packaging or disposing of the stainless steel wire may make it possible to process a few residual fragments of graphite.

On the other hand, the object of the separation is to obtain, at the second output 16b of the second stage 12b of the separator, only pieces of graphite which constitute the majority of the bulk of the elements processed with a view to their disposal and which have low or moderate activity.

The second output 16b of the separator stage 12b is arranged above the input end of a continuous handling means 21 which may consist for example of a belt conveyor. The belt conveyor 21 has drive means which make it possible to run it in either direction, as schematically represented by the double arrows 22. The input end of the conveyor 21 is situated above the hopper 18 for receiving the stainless steel wire.

The output end of the conveyor 21 is placed inside a hopper 24 comprising a closure hatch 25 at its lower part, making it possible to isolate the hopper 24 or make it communicate with an output chute or a packaging container 26 as will be explained with reference to FIGS. 2A, 2B and 2C.

A radioactivity detector 27, such as a scintillation detector, is arranged above the belt of the conveyor 21. The detector 27 is adjusted to a sensitivity level such that it makes it possible to detect any segment of stainless steel wire inside the graphite fragments supported by the conveyor 21 in the first direction of motion of the conveyor going from the input end, below the output 16b of the separator, to its output end, inside the hopper 24.

The detector 27 is connected to a unit 28 for controlling the motorization of the continuous conveyor 21 and of the input carrier 3.

In the event that the detector 27 detects the presence of at least one stainless steel wire in the graphite fragments transported by the conveyor 21, the control unit 28 stops the conveyor 21, closes the output 16b of the separator, then operates the continuous conveyor 21 in its second direction of motion, going from the hopper 24 to the hopper 18.

The fragments of graphite containing one or more segments of stainless steel wire are then discarded into the hopper 18 intended to receive the segments of stainless steel wires.

When the detector 27 no longer detects a high level of radioactivity corresponding to the presence of stainless steel wires on the continuous handling means 21, the latter is operated in its first direction of motion, going from the output 16b of the separator to the hopper 24, the element for blocking the output 16b of the separator being placed in the open position.

In the event that the detector 27 detects a very high level of radioactivity corresponding to a large proportion of stainless steel wires in the graphite particles transported by the conveyor 21, the control unit 28 stops the conveyor 3 feeding the grinding mill.

In effect, in the event that the proportion of stainless steel wires is high, it can be concluded that the separator 12 is malfunctioning and it is then preferable to shut down the entire grinding and separation installation.

The method and the device according to the invention, as described above, therefore make it possible to carry out efficient and very reliable separation of a first constituent and a second constituent having different magnetic properties and activation levels, in activated elements.

The operation of the device according to the invention is completely automatic and does not require the presence of operators near the installation.

Furthermore, the discharge devices for the materials at the output of the installation, which will be described with reference to FIGS. 2A, 2B and 2C, make it possible to discharge, package and dispose of the fragments separated by the separation, without contaminating the environment and under conditions which ensure effective biological protection.

These means are particularly useful as regards removing materials containing mainly stainless steel wire through the first output of the installation comprising the hopper 18, the leaktight closure hatch 19 and the chute or the container 20.

The description of the emptying device represented in FIGS. 2A, 2B and 2C will be given with reference to the elements 18, 19 and 20 of the first output of the installation 1 represented in FIG. 1. However, it is clear that the second output comprising the hopper 24, the hatch 25 and the chute or container 26 can also be produced in the manner described in FIGS. 2A, 2B and 2C.

Figure 2A:
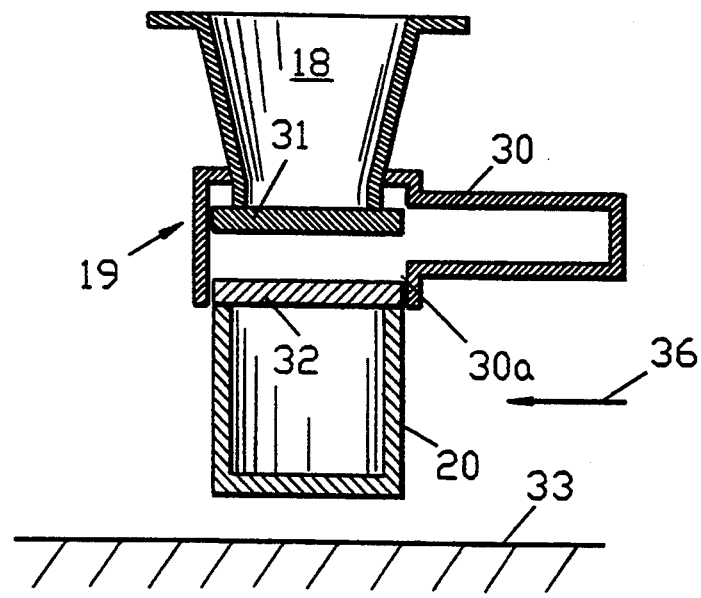
FIGS. 2A, 2B and 2C are views in elevation and in section of a discharge and packaging station of the device represented in FIG. 1, during successive phases of discharge and packaging of the radioactive fragments.
Figure 2B:
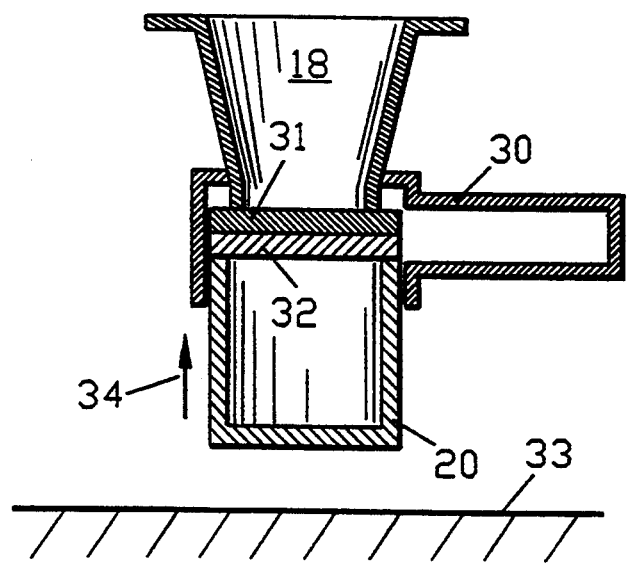
Figure 2C:
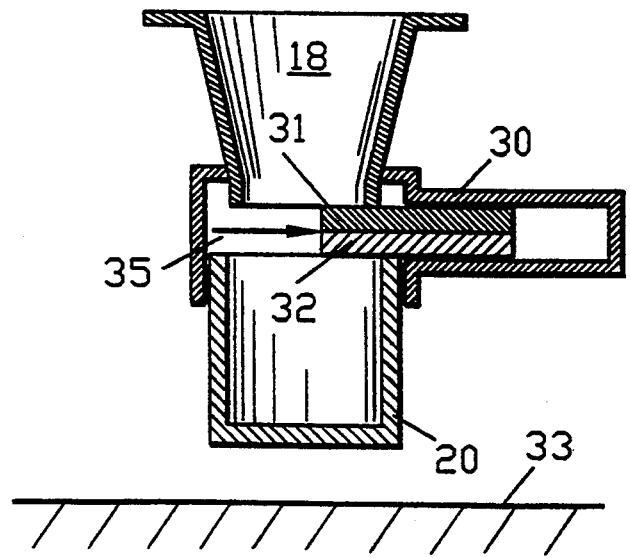

As can be seen in FIGS. 2A, 2B and 2C, the output hopper 18 of the installation comprises at its lower part a hatch 19 comprising a hatch body 30 and a sliding closure element 31.

The lower part of the hatch body 30 has an opening 30a, at which a container 20 can be placed, this container being closed by a leaktight closure element 32, as represented in FIG. 2A.

The container 20 intended to collect the highly radioactive fragments contained in the hopper 18 and consisting mainly of segments of stainless steel wires is a high-integrity container having a large wall thickness. The container 20 can be placed in the position represented in FIG. 2A using a carriage (now shown) which moves it over the floor 33, as schematically represented by the arrow 36.

As can be seen in FIG. 2B, a lifting means combined with the carriage for supporting the container 20 makes it possible to lift the container 20, so as to insert its upper part and the leaktight closure element 32 into the opening 30a of the hatch body 30, as represented by the arrow 34.

At the end of the upwards movement of the container 20, the elements 31 and 32 are in contact with each other.

As represented in FIG. 2C, and represented by the arrow 35, it is then possible to move the two closure elements 31 and 32 simultaneously, so as to place the hopper 18 into communication with the container 20. The radioactive fragments contained in the hopper 18 are then discharged into the container 20 which is filled.

The closure elements 31 and 32 are then moved in the direction opposite to the arrow 35 in order to return them into the position of closing the hopper 18 and the container 20.

The container 20 can then be lowered into the transport position, for removal to a storage site or a processing plant.

It is clear that the removal of the particles of graphite received in the hopper 24 can be carried out by using a container, as in the case of the fragments of stainless steel wires.

However, because of the low radioactivity of the graphite particles, it is also possible to discharge the graphite particles via a chute into a continuous transport means feeding a graphite disposal unit, such as an incineration unit.

The entire installation 1 represented in FIG. 1 can be placed in a containment unit held under reduced pressure using a conventional ventilation system, which need not be described.

In order to operate continuously and entirely automatically, the installation may comprise various detection and control means. In particular, the grinding mill 6 may comprise level detection means. These detection means may be arranged at the grinding mill itself, in order to monitor the feeding of the grinding mill by the carrier 3, or in the outward chute, in order to make it possible to regulate the feed rate of the magnetic separator.

It is possible to use a grinding mill other than an impeller-disk mill and a magnetic separator of a type other than a high-intensity roller separator with permanent magnets based on rare earths.

It is possible to use any type of radioactivity detector for detecting stainless steel wires, or more generally a constituent with strong radioactivity on the continuous handling means.

Finally, the method and the device of the invention can be used for processing activated elements other than jackets of fuel elements of a reactor of the graphite/gas type. The method and the device according to the invention can be used for processing, before disposal, any radioactive element comprising at least two constituents having substantially different magnetic characteristics and activity levels.

What is claimed is:

1. A method for processing elements activated by irradiation with a view to their removal, the activated elements comprising two constituents having different magnetic characteristics, a first one of said constituents having a high activity and a second one of said constituents having a substantially lower activity, said method comprising the steps of:
   (a) grinding the activated elements to obtain unit fragments, comprising first fragments consisting mainly of said first constituent and second fragments consisting mainly of said second constituent;
   (b) separating said first fragments consisting mainly of said first constituent and sending said first fragments by magnetic means to a first discharge and storage station, and separating second fragments consisting mainly of said second constituent and sending said second fragments by magnetic means to a continuous handling means;
   (c) continuously detecting by radioactivity measurement whether first fragments consisting mainly of said first constituent are present among said second fragments on said continuous handling means; and
   (d) sending said second fragments deposited on said continuous handling means to a second discharge and storage station if no first fragment of said first constituent is detected on said continuous handling means, and to said first discharge and storage station if at least one fragment of said first constituent is detected on said continuous handling means.

2. A method according to claim 1, wherein the elements activated by irradiation are jackets of fuel elements of a reactor of the graphite/gas type, which consist of a tubular graphite element and of stainless steel wires implanted in the graphite element, and wherein grinding of the tubular graphite elements is carried out to obtain pieces of graphite and segments of stainless steel wires.

3. A method according to claim 2, comprising collecting the segments of stainless steel wires separated from the pieces of graphite in a high-integrity container.

4. A device for removing elements activated by irradiation, said device comprising (a) a grinding mill;
(b) means for removing a product in divided form at an output of said grinding mill;
(c) a magnetic separator having an input part communicating with a removal means of said grinding mill in order to feed it and first and second output paths for said product in divided form;
(d) a first storage and removal means into which said first output path of the separator emerges;
(e) a continuous handling means with two directions of motion, comprising a first end arranged below said second output path of said separator and above said first storage and removal means;
(f) a radioactivity detector arranged in proximity to said continuous handling means and connected to a control unit of said continuous handling means; and
(g) a second storage and removal means arranged below a second end of said continuous handling means to receive divided products discharged by said continuous handling means in a first direction of motion.

5. A device according to claim 4, wherein said grinding mill is an impeller-disk mill.

6. A device according to claim 4 or 5, wherein said magnetic separator is a high-intensity roller separator comprising permanent magnets based on rare earths.

7. A device according to claim 6, wherein said magnetic separator comprises two separation stages.

8. A device according to claim 4, wherein said radioactivity detector is a scintillation detector.

9. A device according to claim 4, wherein at least one of said first storage and removal means and of said second storage and removal means comprises a hopper, a hatch body arranged under an outlet opening of said hopper, an element for closing said hopper, a transport and storage container comprising a leaktight closure element, means for transporting and lifting said container into an opening of said hatch body and means for moving closure elements of the hopper and of said container by sliding inside said hatch body, so as to selectively isolate and bring into communication said hopper and said container in lifted and engaged position inside said opening of said hatch body.

* * * * *